United States Patent
Franco

(10) Patent No.: US 10,709,269 B2
(45) Date of Patent: Jul. 14, 2020

(54) MULTI-ANGULAR RECONFIGURABLE HANGING APPARATUS

(71) Applicant: COMSERO, INC., Denver, CO (US)

(72) Inventor: Anthony Franco, Broomfield, CO (US)

(73) Assignee: Comsero Inc., Denver, CO (US)

( * ) Notice: Subject to any disclaimer, the term of this patent is extended or adjusted under 35 U.S.C. 154(b) by 0 days.

(21) Appl. No.: 16/138,642

(22) Filed: Sep. 21, 2018

(65) Prior Publication Data

US 2019/0082862 A1 Mar. 21, 2019

Related U.S. Application Data

(60) Provisional application No. 62/561,559, filed on Sep. 21, 2017.

(51) Int. Cl.
| | |
|---|---|
| A47G 1/16 | (2006.01) |
| F16M 13/02 | (2006.01) |
| F16M 11/04 | (2006.01) |
| A47G 1/24 | (2006.01) |

(52) U.S. Cl.
CPC .......... A47G 1/1606 (2013.01); F16M 13/02 (2013.01); A47G 1/24 (2013.01); F16M 11/041 (2013.01)

(58) Field of Classification Search
CPC ..... A47G 1/1606; A47G 1/1613; A47G 1/166
See application file for complete search history.

(56) References Cited

U.S. PATENT DOCUMENTS

| | | | |
|---|---|---|---|
| 3,110,917 A | | 11/1963 | Mcpeek |
| 3,529,799 A | * | 9/1970 | Schaefer ............... A47G 1/1613 248/496 |
| 3,861,639 A | * | 1/1975 | Morrill ............... A47G 1/1606 248/489 |
| 4,100,684 A | | 7/1978 | Berger |
| 4,207,646 A | | 6/1980 | Osborne |
| 4,262,874 A | * | 4/1981 | Seigh ................... A47G 1/1646 248/467 |
| 4,315,615 A | * | 2/1982 | Scocozza ............. A47G 1/1606 248/220.21 |
| 4,415,092 A | | 11/1983 | Boyer |
| 4,437,639 A | * | 3/1984 | Stein ...................... F16M 13/02 248/489 |
| 4,875,591 A | | 10/1989 | Mikesell |
| 5,072,483 A | | 12/1991 | Durand |
| D333,085 S | * | 2/1993 | Thomsen ...................... D8/349 |
| 5,249,765 A | * | 10/1993 | Garcia ................. A47G 1/1606 248/475.1 |
| 5,269,083 A | | 12/1993 | Vampatella et al. |
| 5,425,524 A | * | 6/1995 | Messina, Jr. ......... A47G 1/1606 248/475.1 |
| 5,432,973 A | | 7/1995 | Wagner et al. |

(Continued)

OTHER PUBLICATIONS

Office Action dated Nov. 30, 2018 in U.S. Appl. No. 16/138,487.

*Primary Examiner* — Bradley Duckworth
(74) *Attorney, Agent, or Firm* — Dorsey & Whitney LLP

(57) ABSTRACT

The preferred embodiment of the present invention comprises a wall hanging apparatus allowing removable fixation of an object, such as a board, to a structure and allowing a user rapidly adjust the angular orientation of the object in relation to the wall. More specifically, embodiments of the present invention relate to a wall hanging apparatus allowing modular mounting and reconfigurability of boards.

19 Claims, 2 Drawing Sheets

(56) References Cited

U.S. PATENT DOCUMENTS

| | | | |
|---|---|---|---|
| 5,605,313 A * | 2/1997 | Erickson | A47G 1/1606 248/467 |
| 5,775,919 A | 7/1998 | Gardner | |
| 5,836,038 A | 11/1998 | Thorp | |
| 5,947,304 A | 9/1999 | Thorp | |
| 6,007,891 A | 12/1999 | Davis et al. | |
| 6,056,468 A | 5/2000 | Niewiadomski | |
| 6,186,461 B1 | 2/2001 | Pelaez | |
| 6,719,260 B1 * | 4/2004 | Hart | A47G 1/168 248/466 |
| 6,793,430 B1 | 9/2004 | Liu | |
| 6,945,414 B1 * | 9/2005 | Stevens | A47F 5/0846 211/183 |
| 7,309,181 B2 | 12/2007 | Hawkins | |
| 7,891,124 B1 * | 2/2011 | Willis | A47G 1/1606 248/477 |
| 7,967,520 B2 | 6/2011 | Hawkins | |
| 8,032,966 B1 | 10/2011 | Keller | |
| 8,141,838 B2 * | 3/2012 | Johnson | A47G 1/164 248/477 |
| D663,776 S | 7/2012 | Lira-Nunez et al. | |
| D669,937 S | 10/2012 | Lira-Nunez et al. | |
| 8,544,805 B2 * | 10/2013 | Virgin | A47G 1/1606 248/205.3 |
| 8,641,001 B2 * | 2/2014 | Heffernon | F16M 11/041 248/224.8 |
| 8,757,568 B2 * | 6/2014 | Ko | F16M 13/02 211/86.01 |
| 9,395,044 B2 * | 7/2016 | Cheng | A47G 1/1613 |
| 9,409,437 B2 | 8/2016 | Green et al. | |
| 9,486,082 B2 * | 11/2016 | Warncke | A47C 9/06 |
| 9,974,399 B1 * | 5/2018 | Tanger | A47G 1/1606 |
| 10,349,759 B2 * | 7/2019 | Wiggins | A47G 1/16 |
| 2006/0186304 A1 * | 8/2006 | McGee | A47G 1/1606 248/476 |
| 2007/0186384 A1 * | 8/2007 | Broehl | A47G 1/1613 16/355 |
| 2008/0120922 A1 | 5/2008 | Sullivan et al. | |
| 2008/0166173 A1 | 7/2008 | Gibbons | |
| 2009/0193629 A1 | 8/2009 | Suenaga | |
| 2009/0250575 A1 | 10/2009 | Fullerton et al. | |
| 2010/0068422 A1 | 3/2010 | Keyes | |
| 2012/0112022 A1 * | 5/2012 | Cheng | A47G 7/044 248/205.3 |
| 2013/0074299 A1 | 3/2013 | Rojdev | |
| 2014/0265765 A1 * | 9/2014 | Khodapanah | F16M 13/02 312/223.1 |
| 2014/0377736 A1 | 12/2014 | Essen et al. | |
| 2016/0073796 A1 | 3/2016 | Nesbitt | |
| 2018/0125269 A1 * | 5/2018 | Smeja | A47B 96/068 |

* cited by examiner

MULTI-ANGULAR RECONFIGURABLE HANGING APPARATUS

CROSS REFERENCE TO RELATED APPLICATIONS

This application claims the benefit of U.S. Provisional Patent Application 62/561,559, filed on Sep. 21, 2017, which is hereby incorporated by reference in its entirety.

FIELD OF THE INVENTION

The present invention relates to a wall hanging apparatus allowing removable fixation of an object, such as a board, to a structure and allowing a user rapidly adjust the angular orientation of the object in relation to the wall. More specifically, the present invention relates to a wall hanging apparatus allowing modular mounting and reconfigurability of boards.

BACKGROUND OF THE INVENTION

Some objects, such as photographs, paintings, panels or screens affix to a substantially flat surface, such as a wall, using traditional fixation methods, such as via fasteners such as screws. Others use fixation devices to affix the object to the wall in a particular orientation. Some examples of fixation devices include hooks mounted to a wall, cables affixed to the back of an object to interface with mounted wall hooks, or other specialized fixation devices intended to interface with a particular object such as a television. Traditional fixation methods are intended to hang or affix the object to the wall in a particular or singular configuration. Traditional fixation methods generally fail to allow the objects affixed to a substantially flat surface to be rapidly removable or reconfigured.

For some activities related to content creation, such as collaborative, brainstorming or ideation sessions involving a group of people, users of white boards, chalk boards and other erasable writing boards, also referred to collectively herein as "board," individuals find the permanent fixation of a board limits content creation.

The invention disclosed in U.S. patent application Ser. No. 14/225,607 to Warncke, et al. ("Warncke") surrounds a wall hanging device leveraging a traditional "French Cleat" mounting system in the prior art. Although Warncke provides for rapid mounting and dismounting of an article from a wall, the invention as disclosed is limited to a singular mounting configuration once the elements of the invention are installed to a wall and the article. A need remains for the rapid mounting and dismounting of an article for a wall with multiple available configurations.

Boards affixed to a surface via traditional fixation methods often fail to provide a suitable option to preserve written content. To address this need, prior art users photograph the board prior to the erasure of the written content, which is associated with the disadvantages of requiring a camera and a means to store and organize photographs of the written content. Some scenarios require the erasure of boards for the purposes of creating new content or keeping the content private from a third party. Some scenarios require the erasure of a board which results in potentially losing the benefit maintaining the visibility of the content for collaborative purposes. In other scenarios, a board may display content deemed valuable to keep visible in a group setting and is not erased, thereby limiting usable area of the board until the content is erased.

In certain circumstances, a board mounted with traditional means result in the hanging of a board in a singular orientation unless a user takes the time to uninstall the mounting surface and reinstall it to the board. Alternatively, a user may install a secondary fixation device to a surface of a board or other object to allow the mounting of the board in an alternative mounting configuration. However, this is cumbersome and inefficient.

A variety of existing solutions provide the ability to rapidly mount an object in one of various configurations without requiring additional hardware, tools, or fixation devices. However, such solutions generally fail to provide a user-rotative reconfigurability consistent with standard angle intervals. Generally, such solutions provide for the adjustability of the object in angular increments to as little as one-degree. Thus, although a user may mount an object in accordance with standard angular increments, arriving at such standard angular increments is inefficient and may be frustrating—particularly to those that find objects hanging askew or not in accordance to standard angles to be discordant. Furthermore, some of these solutions fail to allow the 360-degree reconfigurability of an object without additional hardware, tools, or fixation devices.

Some previous solutions do allow for 360-degree adjustability of an object when affixed to a wall. However, such solutions fail to provide rotative configurability at standard angle increments.

There is, therefore, an identified need to allow the rapid removable fixation and angular reconfiguration of objects, including boards, to a surface.

SUMMARY OF THE INVENTION

It is an aspect of various embodiments of the present invention to provide a rapidly removable and rapidly mountable fixation device allowing a user to easily remove and replace a board, thus not requiring a user to erase valuable content.

It is an aspect of certain embodiments of the present invention to allow a user to rapidly reconfigure the hanging orientation of a board in one of various angular configurations without requiring additional hardware, tools, or fixation devices.

It is a further aspect of various embodiments of present invention to allow a user to rapidly reconfigure the hanging orientation of a board to one of various angular configurations restricted to standard angular intervals. In certain embodiments, a standard angle will be appreciated to persons having ordinary skill in the art to be an angle corresponding with the list of angles consisting of 0-degrees, 30-degrees, 45-degrees, 60-degrees, and 90-degrees. Embodiments of the present invention incorporating standard angles represent an advantage over embodiments incorporating non-standard angles, which the present inventors have recognized may be perceived by some users as lacking aesthetically pleasing results.

It is yet another aspect of embodiments of the present invention to provide the rapidly reconfigurable angular orientation of a board in a rotative manner allowing 360-degree reconfigurability.

These and other advantages will be apparent from the disclosure of the inventions contained herein. The above-described embodiments, objectives, and configurations are neither complete nor exhaustive. As will be appreciated, other embodiments of the invention are possible using, alone or in combination, one or more of the aspects of the invention set forth above or described in detail below.

Further, this Summary is neither intended nor should it be construed as being representative of the full extent and scope of the present invention. The present invention is set forth in various levels of detail in this Summary, as well as in the attached drawings and the detailed description below, and no limitation as to the scope of the present invention is intended to either the inclusion or non-inclusion of elements, components, etc. in this Summary. Additional aspects of the present invention will become more readily apparent from the detailed description, particularly when taken together with the drawings, and the claims provided herein.

BRIEF DESCRIPTION OF THE DRAWINGS

FIG. 1B—A rear view of an apparatus of various embodiments

FIG. 2B—A cross sectional view of an assembled apparatus of various embodiments

DETAILED DESCRIPTION OF VARIOUS EMBODIMENTS

As described below, various embodiments of the present invention surround a multi-angular reconfigurable rapid hanging solution for the rapid mounting and dismounting of an object to a surface in various angular configurations at predetermined angular intervals. Certain embodiments of the present invention, shown in FIG. 1A and FIG. 1B comprise a first element 1100 having mounting apertures 1130 or other means of fixation to an object. However, it will be appreciated that a first element 1100 of the present invention may be affixed to an object using permanent or temporary fixation means known to person of ordinary skill in the art including but not limited to—adhesive, hook-and-loop, and fusion.

Certain embodiments of the present invention comprise a second element 1200 configured for receiving a first element 1100, and having mounting apertures 1240 or means of fixation to a surface. However, it will be appreciated that a second element of the present invention may be affixed to a surface using permanent or temporary fixation means known to persons of ordinary skill in the art including but not limited to—adhesive, hook-and-loop, and fusion.

Certain embodiments of the present invention comprise an apparatus 1000, shown in FIG. 1A-FIG. 2B. In certain embodiments, the apparatus 1000 comprises a first element 1100 having a first polygonal form and a second element 1200 having a cutout 1210 configured to receive the first element 1100.

Certain embodiments (FIG. 1A and FIG. 1B) comprise a first element 1100 having a plate form. However, it will be appreciated that the first element 1100 may take other forms. In alternative embodiments, forms of the first element 1100 having a plurality of sides 1110 disposed at standard angles may be used while remaining within the scope and spirit of the present invention.

Figure 1A:
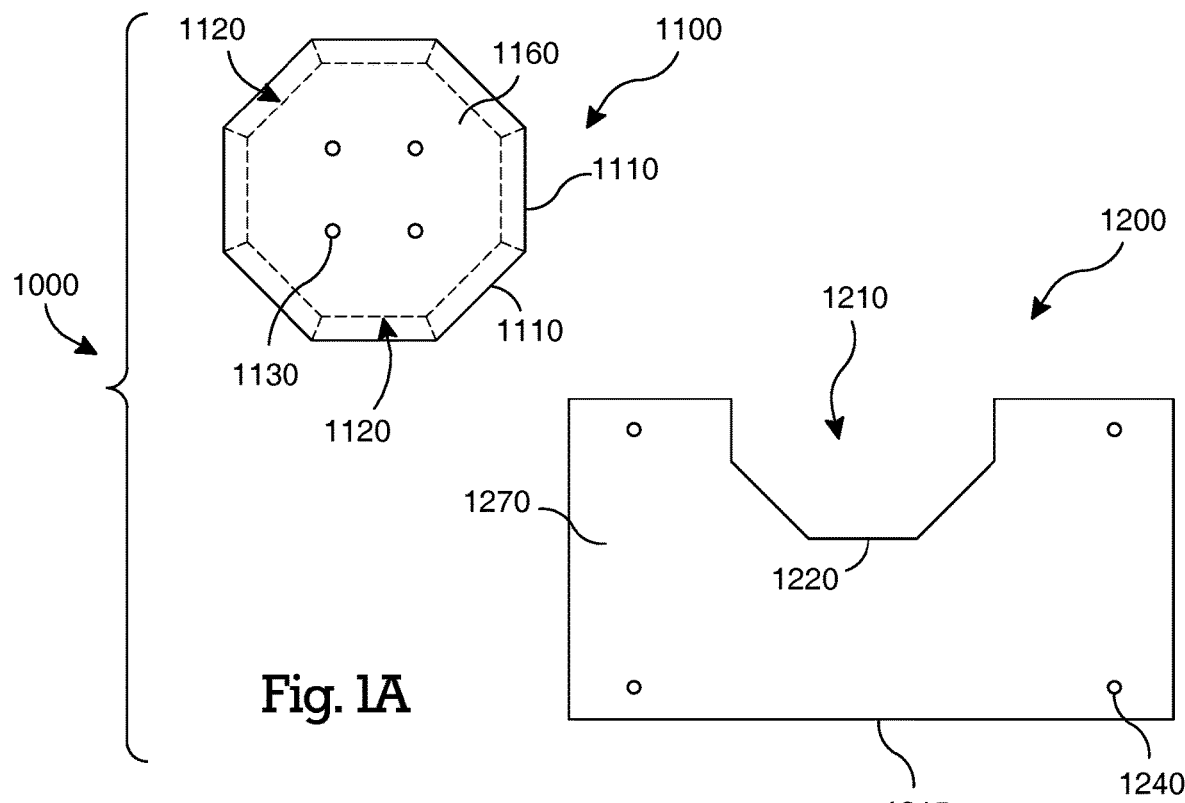
FIG. 1A—A front view of an apparatus of various embodiments
Figure 1B:
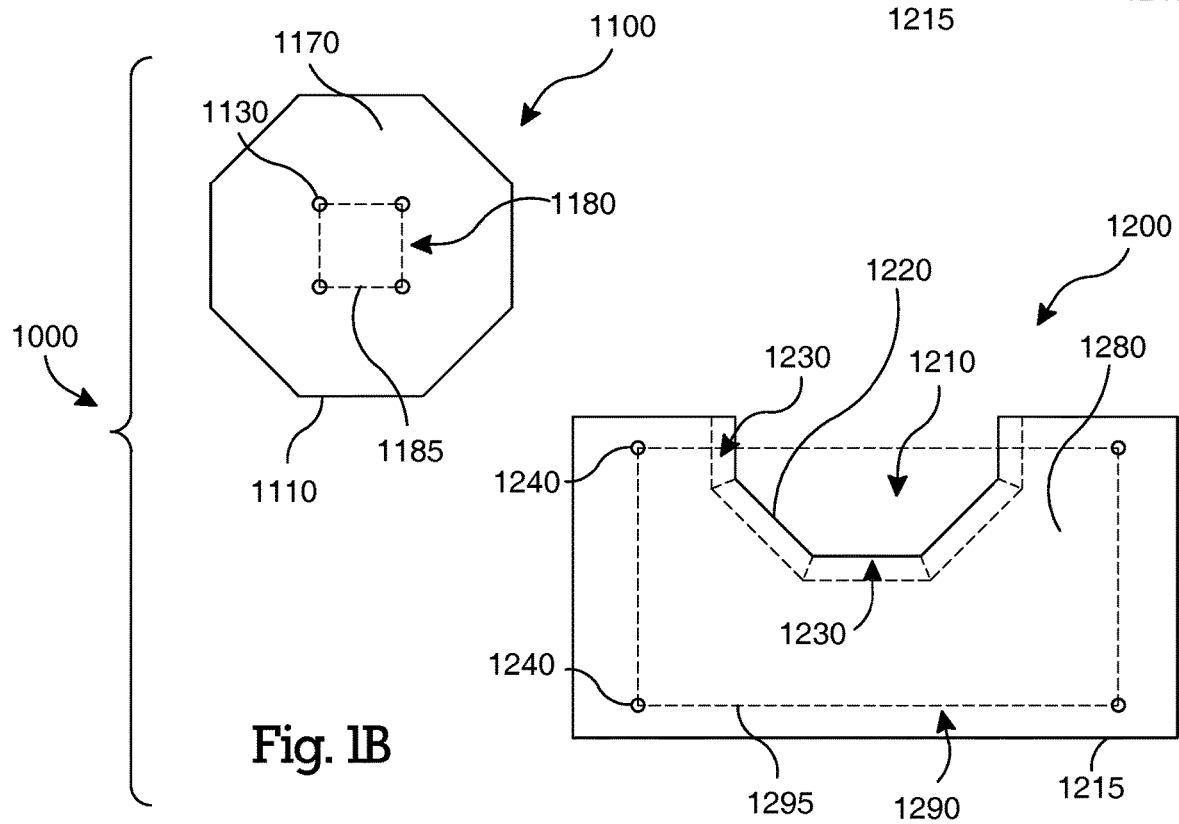

Certain embodiments comprise a second element 1200 having a plate form, shown in FIG. 1A and FIG. 1B. However, it will be appreciated that the second element 1200 may take other forms. In alternative embodiments, a second element 1200 comprises a cutout 1210 having a plurality of sides 1220 disposed at standard angles may be used while remaining within the scope and spirit of the present invention.

In certain embodiments, as shown in FIG. 1A and FIG. 1B, the first element 1100 resembles a polygonal shape, and the second element 1200 has a polygonal cutout 1210 configured to receive at least two sides 1110 of the polygonal shape of the first element 1100.

Figure 2A:
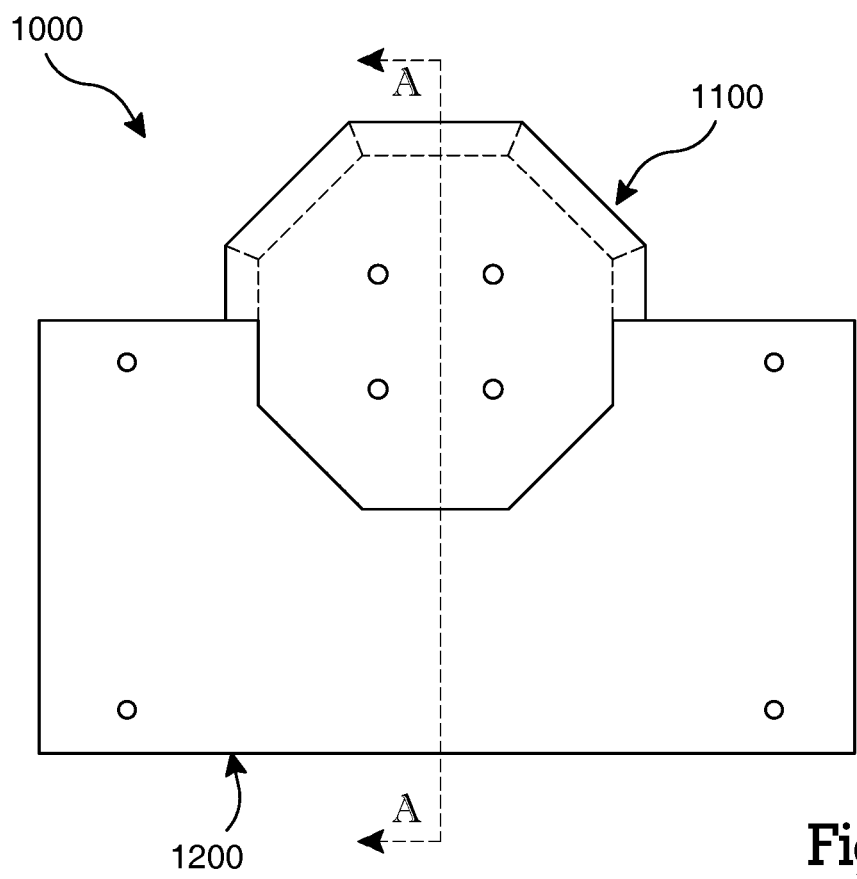
FIG. 2A—A front view of an assembled apparatus of various embodiments
Figure 2B:
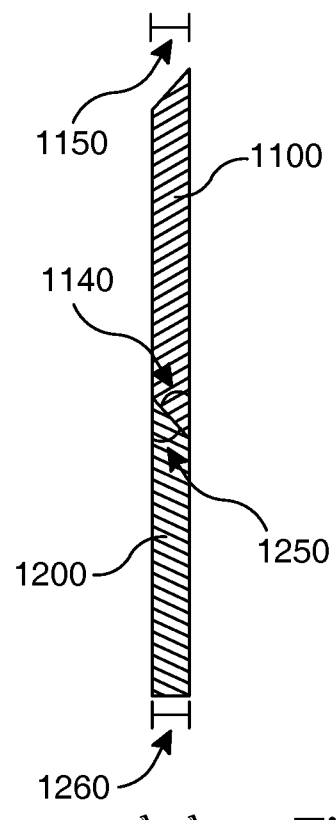

In certain embodiments, as shown in FIG. 1A and FIG. 2B, a first element 1100 has an angle 1140 consistent with a first side 1110. It will be appreciated that an angle 1140 consistent with a first side 1110, may be a chamfered edge, a bevel edge, or tapered form, or other edge treatment known to those having ordinary skill in the art. In certain embodiments, an angle 1140 is continuous around a perimeter of the first element 1100. In certain embodiments, the first element 1100 has a bevel 1120 across a thickness 1150 of the first element. Thus, in certain embodiments, the first element 1100 is a polygonal frustum. In certain embodiments, the first element 1100 resembles a regular polygonal frustum. It will be appreciated to persons having ordinary skill in the art that a regular polygon refers to a polygon having equal sides and equal interior angles such as a square or equilateral triangle. For example, a pyramidal frustum is a regular polygonal frustum.

In certain embodiments, as shown in FIG. 1B and FIG. 2B, a second element 1200 has an angle 1250 consistent with a first side 1220 of a cutout. It will be appreciated that an angle 1250 consistent with a first side 1220, may be a chamfered edge, a bevel edge, or tapered form, or other edge treatment known to those having ordinary skill in the art. In certain embodiments, an angle 1250 is continuous around multiple sides of the cutout 1210 of the second element. In certain embodiments, the cutout 1210 of the second element has a bevel 1230 across a thickness 1260 of the second element. Thus, in certain embodiments, the cutout 1210 of the second element is configured to receive a polygonal frustum. In certain embodiments, the cutout 1210 of the second element is configured to receive a regular polygonal frustum.

In certain embodiments, shown in FIG. 1A-FIG. 2A, the first element 1100 resembles a regular octagonal frustum and the second element 1200 has a cutout 1210 configured to receive the first element 1100 by interfacing with at least two sides 1110 of the first element. It will be appreciated by a person having ordinary skill in the art that a regular octagon comprises 45-degree exterior angles. Thus, the first element 1100 of such embodiments allows rotative reconfigurability at standard angle increments. Furthermore, an object or board having the first element 1100 of such embodiments may be mounted to it can be rapidly affixed and rotatively configured consistent with standard angles. In various embodiments, the cutout 1210 of the second element is configured to receive a plurality of sides 1110 of the first element. In consideration of certain embodiments having a first element 1100 having a number of sides 1110 'n', with n being an odd number, the cutout 1210 of the second element is configured to receive the first element 1100 and interface with up to (n+1)/2 sides 1110. In consideration of certain embodiments having a first element 1100 having a number of sides 1110 'n', with n being an even number, the cutout 1210 of the second element is configured to receive the first element 1100 and interface with up to n/2+1 sides 1110.

The first element 1100 in certain embodiments, shown in FIG. 1A-FIG. 2B, comprises a regular polygonal shape. In certain embodiments, a first element 1100 comprises a regular octagonal shape. The second element 1200 in certain embodiments comprises a cutout 1210 configured to receive the first element 1100 such that a first element 1100 is constrained by the second element 1200, yet allows for the rapid removal of the first element 1100.

The apparatus 1000 in certain embodiments, shown in FIG. 1A-2B, comprises a first element 1100 having a first side 1160. The first side 1160 comprises a first bevel 1120 extending between a first surface 1160 and a second surface 1170 of the first element. The apparatus 1000 in certain embodiments, comprises a second element 1200 comprising a cutout 1210 configured to receive the first element 1100, and the cutout 1210 having a first side 1220. The first side of the cutout 1210 comprises a bevel 1230 extending between a first surface 1280 and a second surface 1270 of the second element. The bevel 1160 of the first element and the bevel 1230 of the second element are configured to mate such that the first element 1100 disposed within the cutout 1210 of the second element results in the retention of the first 1000 element to the second element 1200. It will be appreciated by a person having ordinary skill in the art that the retention of a first element 1100 within the cutout 1210 of a second element 1200, wherein the cutout 1210 is configured in a vertically upward pointing orientation as shown in FIG. 1A-FIG. 2A, results in retention of the first element 1100 to the second element 1200 by the forces due to gravity. However, it will be further appreciated that in certain embodiments a cutout 1210 may be configured in other orientations, such as horizontally directed, and still retains the first element 1100 to the second element 1200 by forces due to gravity. It will be further appreciated still that in certain embodiments a cutout 1210 may be configured in an alternative orientation, such as vertically downwards and thereby rely upon retention methods known to those skilled in the art to retain the first element 1100 to the second element 1200 while remaining within the scope and spirit of the present invention.

In certain embodiments, shown in FIG. 2B, a first bevel 1120 of the first element comprises an angle 1140 of 45-degrees and a first bevel 1230 of a second element comprises an angle 1250 of 45-degrees. In certain embodiments, a first angle 1140 of the first element is between 0-90 degrees, and the second element 1200 comprises a first angle 1250 complimentary to the first angle 1250 of the first element. However, it will be appreciated by a person of ordinary skill in the art that a first angle 1140 of a first element and a first angle 1250 of a second element need not be complimentary to retain the first element 1100 to the second element 1200. As such, it will be appreciated that a first angle 1140 of a first element and a first angle 1250 of a second element 1200 may be non-complimentary while remaining within the scope and spirit of the present invention.

A first element 1100 in certain embodiments, shown in FIG. 1A and FIG. 1B, comprises an aperture 1240 for the fixation of the first element 1100 to a rear surface of an object, such as a board. The aperture 1240 of certain embodiments extends through a thickness 1150 (FIG. 2B) of the first element 1100. In certain embodiments, the first element 1100 comprises a plurality of apertures 1140. In certain embodiments, a first element 1100 comprises four apertures in a square configuration 1180. The square configuration 1180 is centered on the first element 1100 and has a first side 1185 parallel with a first side 1110 of the first element.

In certain embodiments, the second element 1200, shown in FIG. 1A and FIG. 1B, comprises an aperture 1240 for the fixation of the second element 1200 to a rear surface of an object, such as a board. The aperture 1240 of certain embodiments extends through a thickness 1260 (FIG. 2B) of the second element. In certain embodiments, a second element 1200 comprises a plurality of apertures 1240. In certain embodiments, a second element 1200 comprises four apertures 1240 in a rectangular configuration 1290. The rectangular configuration 1290 is centered on the second element 1200 and has a first side 1295 parallel with a first side 1220 of a cutout 1210.

In certain embodiments, shown in FIG. 1A-FIG. 2A, a first element 1100 is affixed to an object, such as a board, and a second element 1200 is affixed to a surface, such as a wall. The first element 1100 having eight sides 1110, and each of those eight sides 1110 having a bevel 1120. The second element 1200 having a cutout 1210 configured to receive the first element 1100. The cutout 1210 having five sides 1220, each side having a bevel 1230. The cutout 1210 further comprises a first side 1220 parallel to a first side 1110 of the second element 1200. When the first element 1100 and the second element 1200 are mated, bevels 1120 of the first element mate with bevels 1230 of the second element, thereby retaining the first element 1100 to the second element 1200.

The following references related to wall hanging an object are hereby incorporated by reference in their entireties: U.S. Pat. No. 3,529,799 to Schaefer ("Schaefer"); U.S. Pat. No. 9,395,044 to Cheng ("the 044 reference"); and U.S. patent application Ser. No. 13/083,074 to Cheng ("the 022 reference"). U.S. Pat. No. 3,861,639 to Morrill ("Morrill"); U.S. Pat. No. 4,437,639 to Stein ("Stein"); and U.S. Pat. No. 6,719,260 to Hart ("Hart"). Each of the above reference patent publications provide for 360-degree adjustability of an object when affixed to a wall.

The following references generally related to wall hanging apparatuses are hereby incorporated by reference in their entireties: U.S. Pat. No. 6,945,414 to Stevens et al., disclosing a wall panel and system; U.S. Pat. No. 8,757,568 to Ko, disclosing a wall mount assembly; and U.S. Patent Publication No. 2014/0265765 to Khodapanah, et al. disclosing a releasable mount apparatus and system.

While various embodiments of the present invention have been described in detail, it is apparent that modifications and alterations of those embodiments will occur to those skilled in the art. However, it is to be expressly understood that such modifications and alterations are within the scope and spirit of the present invention. Further, the inventions described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

What is claimed is:

1. A hanging system comprising:
  a first element configured to be coupled to an object, the first element having a thickness and a regular octagonal shape featuring eight sides; wherein, the first element includes a front first element wall, a rear first element wall, and a bevel on each of its eight sides, wherein the bevel extends at an angle from the front first element wall to the rear first element wall; and
  a second element mounted to a surface and including a cutout complementary to the octagonal shape, the second element comprising a front second element wall and a rear second element wall, wherein the cutout defines a complementary bevel edge extending at an angle from the rear second element wall to the front second element wall, wherein:
the first element seats in the cutout on the bevel edge to be coupled to the surface at different orientations and in the different orientations a first edge of the first element faces in different directions relative to the second element; and
when the first element is seated in the cutout on the bevel edge, the front first element wall and the front second element wall are flush with one another and contact the object and the rear first element wall and the rear second element wall are flush with one another and contact the surface.

2. The system of claim 1, wherein the first element is removably retainable within the second element and rotatively reconfigurable in 45-degree increments.

3. The system of claim 2, the second element featuring a thickness substantially similar to the thickness of the first element.

4. The system of claim 2, the cutout having a truncated regular octagonal form, and the cutout having five sides with a first side parallel to a first side of the truncated regular octagonal form.

5. The system of claim 4, wherein the bevel edge is defined on each of the five sides.

6. The system of claim 2, the first element featuring four apertures, the four apertures arranged in a square configuration, the square configuration centered on the first element, and a first side of the square configuration parallel with a first side of the first element.

7. The system of claim 2, the second element featuring four apertures, the four apertures extending through the second element, the four apertures arranged in a rectangular configuration with the rectangular configuration centered with the second element, and a first side of the rectangular configuration parallel with a first side of the second element.

8. The system of claim 2, the second element further comprising a rectangular perimeter.

9. A surface mounting system comprising:
a stationary element configured to be secured to a surface in a first orientation, the stationary element defining a keying edge extending at an angle from a front surface of the stationary element to a rear surface of the stationary element;
a mounting element having a shape complementary to the keying edge and defining a connecting edge that extends at an angle from a rear surface of the mounting element to a front surface of the mounting element, wherein the connecting edge of the mounting element seats on the keying edge of the stationary element to be coupled to the surface; and
an object coupled to the mounting element; wherein:
the mounting element is positionable at multiple orientations to seat on the keying edge such that the object is operable to be supported on the surface at multiple orientations relative to the first orientation of the stationary element; and
due to a complementary shape of the angle of the keying edge and the angle of the connecting edge, when the mounting element is positioned on the stationary element, the front surface of the stationary element and the front surface of the mounting element are aligned with one another and contact the object and the rear surface of the stationary element and the rear surface of the mounting element are aligned with one another and contact the surface.

10. The surface mounting system of claim 9, wherein the mounting element comprises a polygonal shape having a plurality of sides, wherein a number of the plurality of sides defines a number of the multiple orientations that the object is positionable relative to the stationary element.

11. The surface mounting system of claim 9, wherein the stationary element has a top surface and the multiple orientations comprise:
a first orientation where a first edge of the object faces in a same direction as the top surface of the stationary element; and
a second orientation where the first edge of the object faces in a different direction as the top surface of the stationary element.

12. The surface mounting system of claim 11, wherein in the second orientation the first edge faces in an opposite direction as the top surface.

13. The surface mounting system of claim 11, wherein the keying edge engages the mounting element to define the multiple orientations.

14. The surface mounting system of claim 9, wherein the multiple orientations comprise:
a first orientation where a first edge of the object faces in a first direction relative to the stationary element;
a second orientation where the first edge of the object faces in a second direction relative to the stationary element; and
a third orientation where the first edge of the object faces in a third direction relative to the stationary element.

15. The surface mounting system of claim 14, wherein the first direction is perpendicular to the second direction and the second direction and the third direction are perpendicular to one another.

16. The surface mounting system of claim 9, wherein the shape is an octagonal shape and the keying edge defines at least four angled side edges complementary to at least four sides of the octagonal shape.

17. The surface mounting system of claim 9, wherein in each of the multiple orientations, the object is supported in a parallel orientation relative to the surface.

18. A wall hanging system for an object comprising:
a mounted element configured to be securely connected to a wall in a fixed orientation, the mounted element having a rear surface, a front surface, and a top surface defining a keying edge, the keying edge extending at an angle between the rear surface and the front surface; and
a support element coupled to the object and positionable in multiple orientations within the mounted element to orient the object in different parallel positions relative to the wall, the support element defining a connecting edge, the connecting edge extending between a front surface of the support element and a rear surface of the support element, wherein:
the support element is secured to the mounted element in the multiple orientations via the keying edge; and
when the support element is secured to the mounted element, due to the angle of the keying edge and the angle of the connecting edge, the rear surface of the mounted element and the rear surface of the support element are aligned with one another such that both rear surfaces contact the wall and the front surface of the mounted element and the front surface of the support element are aligned with one another such that both front surfaces contact the object.

19. The wall hanging system of claim 18, wherein the support element comprises an octagonal shape, wherein the octagonal shape and the keying edge define the multiple orientations.

\* \* \* \* \*